(12) United States Patent
Wagers (10) Patent No.: US 8,936,143 B2
(45) Date of Patent: Jan. 20, 2015

(54) WRAP SPRING CLUTCH ACTUATOR AND METHODS FOR SAME

(75) Inventor: Jesse Wagers, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 209 days.

(21) Appl. No.: 13/491,406

(22) Filed: Jun. 7, 2012

(65) Prior Publication Data

US 2013/0175133 A1    Jul. 11, 2013

Related U.S. Application Data

(60) Provisional application No. 61/585,011, filed on Jan. 10, 2012.

(51) Int. Cl.
*F16D 27/105* (2006.01)
*F16D 27/12* (2006.01)

(52) U.S. Cl.
USPC ........ 192/26; 192/48.2; 192/81 C; 192/84.31; 192/84.81

(58) Field of Classification Search
CPC .............................. F16D 27/025; F16D 27/105
USPC ................. 192/23, 26, 84.31, 84.81
See application file for complete search history.

(56) References Cited

U.S. PATENT DOCUMENTS

| | | | |
|---|---|---|---|
| 1,615,502 A | | 1/1927 | Bourn |
| 2,829,748 A | * | 4/1958 | Sacchini et al. ................ 192/26 |
| 3,111,822 A | | 11/1963 | Hansen |
| 3,159,256 A | | 12/1964 | Welsh et al. |
| 3,232,399 A | | 2/1966 | Harned et al. |
| 3,304,793 A | | 2/1967 | Masaharu |
| 3,335,835 A | | 8/1967 | Conlon |
| 3,412,617 A | | 11/1968 | Holzer |
| 3,570,639 A | * | 3/1971 | Fredell et al. ................ 192/81 C |
| 4,321,992 A | | 3/1982 | Gallo |

(Continued)

FOREIGN PATENT DOCUMENTS

WO    WO-03077407 A2    9/2003
WO    WO-2008044058 A1    4/2008

OTHER PUBLICATIONS

"U.S. Appl. No. 13/028,312, Preliminary Amendment filed Aug. 24, 2012", 15 pgs.

(Continued)

*Primary Examiner* — Richard M. Lorence
(74) *Attorney, Agent, or Firm* — Schwegman Lundberg & Woessner, P.A.

(57) ABSTRACT

A wrap spring clutch system includes one or more wrap spring clutch assemblies each having a latching actuator assembly. The latching actuator assembly includes an armature plunger movably coupled with a solenoid coil, and in a powered solenoid coil state the solenoid coil moves the armature plunger between deployed and retracted configurations. A latching magnet latches the armature plunger in one of the deployed or retracted configuration in an unpowered solenoid coil state. A latching spring latches the armature plunger in the other of the deployed or retracted configuration in an unpowered solenoid coil state. The wrap spring clutches include a rotatable input hub and a rotatable output hub configured for rotation by the input hub. A helical spring is engaged with the output hub and selectively engaged in slipping and locking engagement with the input hub according to the deployed or retracted configuration of the armature plunger.

30 Claims, 8 Drawing Sheets

(56) References Cited

U.S. PATENT DOCUMENTS

| | | | |
|---|---|---|---|
| 4,432,675 A | | 2/1984 | Machnee |
| 4,462,013 A | * | 7/1984 | Ueda et al. ............... 335/229 |
| 4,550,860 A | | 11/1985 | Weeder |
| 4,570,768 A | | 2/1986 | Nishimura et al. |
| 4,758,811 A | * | 7/1988 | Slavin et al. ............... 335/234 |
| 5,003,894 A | | 4/1991 | Lafferty |
| 5,078,066 A | | 1/1992 | Lafferty |
| 5,087,940 A | | 2/1992 | Altmann |
| 5,251,735 A | | 10/1993 | Lamoureux |
| 5,318,161 A | | 6/1994 | Lyga |
| 5,335,760 A | | 8/1994 | Leone |
| 5,954,178 A | | 9/1999 | Fischer et al. |
| 6,091,997 A | * | 7/2000 | Flamme et al. ............... 700/83 |
| 6,113,021 A | | 9/2000 | Hosokawa |
| 6,116,797 A | | 9/2000 | Brewington et al. |
| 6,119,841 A | | 9/2000 | Orlamunder |
| 6,240,861 B1 | | 6/2001 | Memory |
| 6,247,569 B1 | | 6/2001 | McGuire et al. |
| 6,305,303 B1 | | 10/2001 | Wright et al. |
| 6,484,861 B1 | | 11/2002 | Wussow |
| 6,695,112 B1 | | 2/2004 | Webber |
| 7,080,936 B1 | | 7/2006 | Simpson |
| 7,273,016 B2 | | 9/2007 | Landphair et al. |
| 7,374,029 B1 | | 5/2008 | Dillman |
| 7,374,030 B1 | | 5/2008 | Dillman |
| 7,497,176 B2 | | 3/2009 | Dillman |
| 7,571,688 B1 | | 8/2009 | Friestad et al. |
| 7,661,516 B2 | | 2/2010 | Dillman |
| 7,661,517 B2 | | 2/2010 | Dillman |
| 7,857,309 B2 | | 12/2010 | Moore |
| 8,140,223 B2 | | 3/2012 | Whitehead et al. |
| 8,869,964 B2 | | 10/2014 | Barry |
| 2007/0151492 A1 | | 7/2007 | Dillman |
| 2007/0151824 A1 | | 7/2007 | Dillman |
| 2007/0181399 A1 | | 8/2007 | Ackermann et al. |
| 2008/0156239 A1 | | 7/2008 | Dillman |
| 2009/0032352 A1 | | 2/2009 | Pritchard et al. |
| 2009/0090283 A1 | | 4/2009 | Riewerts |
| 2009/0266279 A1 | | 10/2009 | Dillman |
| 2009/0272615 A1 | | 11/2009 | Buzzard |
| 2010/0162931 A1 | | 7/2010 | Cannon et al. |

OTHER PUBLICATIONS

"International Application Serial No. PCT/US2011/025168, International Preliminary Report on Patentability mailed Aug. 21, 2012", 15 pgs.

"International Application Serial No. PCT/US2011/025168, International Search Report mailed Apr. 25, 2011", 2 pgs.

"International Application Serial No. PCT/US2011/025168, Preliminary Report on Patentability mailed Aug. 30, 2012", 16 pgs.

"International Application Serial No. PCT/US2011/025168, Written Opinion mailed Apr. 25, 2011", 14 pgs.

"Wrap Spring Products", [Online]. Retrieved from the Internet: <URL: http://www.idicb.com/dynacorp/PDF/Reference/Dynacorp-Ref-WrapSpring.pdf>, (Published prior to Jun. 7, 2012), 2 pgs.

Trenor, Clint, et al., "Clutch Designs for Equipment Controls Optimization", Design News, [Online]. Retrieved from the Internet: <URL: http://www.designnews.com/document.asp?doc_id=229772&dfpPParams=i . . . >, (Dec. 1, 2010), 7 pgs.

U.S. Appl. No. 13/028,312, Final Office Action mailed Jan. 16, 2014, 25 pgs.

U.S. Appl. No. 13/028,312, Non Final Office Action mailed Jun. 5, 2013, 30 pgs.

U.S. Appl. No. 13/028,312, Notice of Allowance mailed Apr. 7, 2014, 8 pgs.

U.S. Appl. No. 13/028,312, Response filed Mar. 12, 2014 to Final Office Action mailed Jan. 16, 2014, 14 pgs.

U.S. Appl. No. 13/028,312, Response filed Oct. 2, 2013 to Non-Final Office Action mailed Jun. 5, 2013, 22 pgs.

\* cited by examiner

WRAP SPRING CLUTCH ACTUATOR AND METHODS FOR SAME

CROSS-REFERENCE TO RELATED APPLICATIONS

This application claims the benefit of U.S. Provisional Application No. 61/585,011, filed Jan. 10, 2012, which application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries. Inc.; Sioux Falls, S. Dak.; All Rights Reserved.

TECHNICAL FIELD

This document pertains generally, but not by way of limitation, to clutch actuation.

BACKGROUND

Actuators, such as wrap spring clutches, are used in various fields to transmit power from a first rotating drive element (input) to a second driven element (output). An intervening helical spring is wrapped around the first and second elements. When rotated in a first direction (i.e., when rotated by the first drive element) the helical coils of the spring compress around the first drive element and grasp the first drive element thereby engaging the first and second elements. Continued rotation in the first direction of the first element and the helical spring correspondingly rotates the second element. Interruption of the rotation of the first element or rotation in an opposed direction of by either of the first or second elements allows the helical spring to relax from the first and second elements and thereby disengages the first element from the second element. Similarly, braking of the spring rotation from rotation with the first and second elements allows the spring to relax and expand relative to its engaged configuration thereby disengaging the first and second elements.

OVERVIEW

The present inventors have recognized, among other things, that a problem to be solved can include operating a wrap spring clutch without continuously applying power to an actuator during, for example, ongoing or non-momentary periods of time. The ongoing supply of power, especially across multiple clutches, may place a significant power draw on a system and require an enhanced power generation capability to operated each of the clutches. In an example, the present subject matter can provide a solution to this problem, such as by the inclusion of a latching actuator assembly with the wrap spring clutch. The latching actuator assembly uses instantaneous (e.g., momentary) application of voltage and counter voltage to a solenoid coil move an armature plunger from an engaged to a disengaged position with respect to the helical spring of the wrap spring clutch. A latching spring and a latching magnet operate to latch the armature plunger in the engaged and disengaged positions without any application of power to the solenoid coil. When actuation between the engaged and disengaged positions is desired the voltage or counter voltage is applied momentarily to move the armature plunger and then interrupted after the transition.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
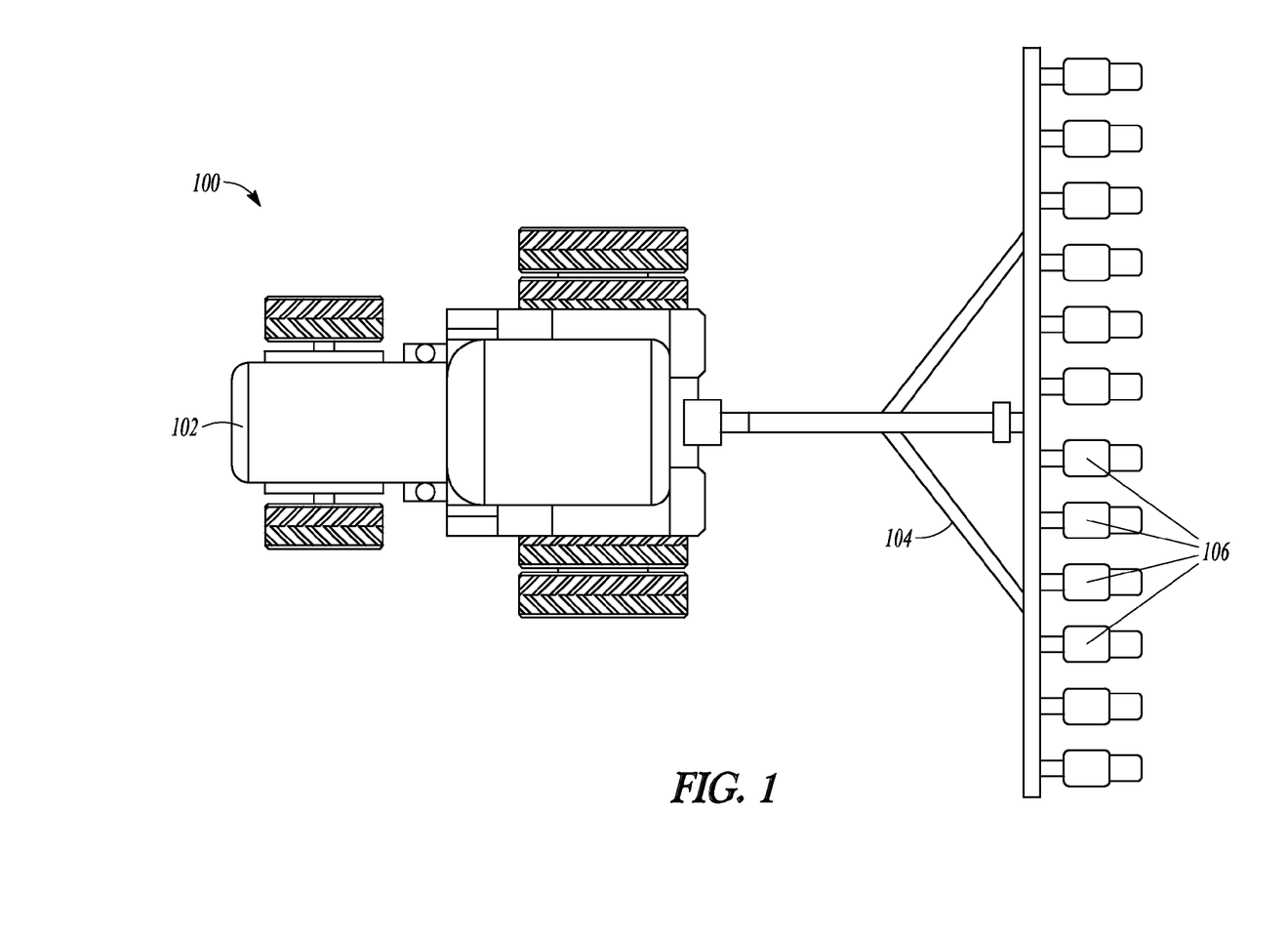
FIG. 1 is an isometric view of an agricultural planter.

FIG. 1 shows one example of an implement train 100 configured for planting seeds in an agricultural field. As shown, the implement train 100 in one example includes a tractor 102 coupled with a planter 104. The planter 104 includes, but is not limited to a multi-row planter having a plurality of planter row assemblies 106. As will be described in further detail below, the planter row assemblies 106 are individually operated according to the size and shape of the agricultural field and to selectively plant portions of the field. The planter row assemblies 106 while being individually operated are powered by one or more rotational shafts extending through a portion of the planter 104 for instance hexagonal shafts configured to provide power to two or more of the planter row assemblies 106.

Figure 2A:
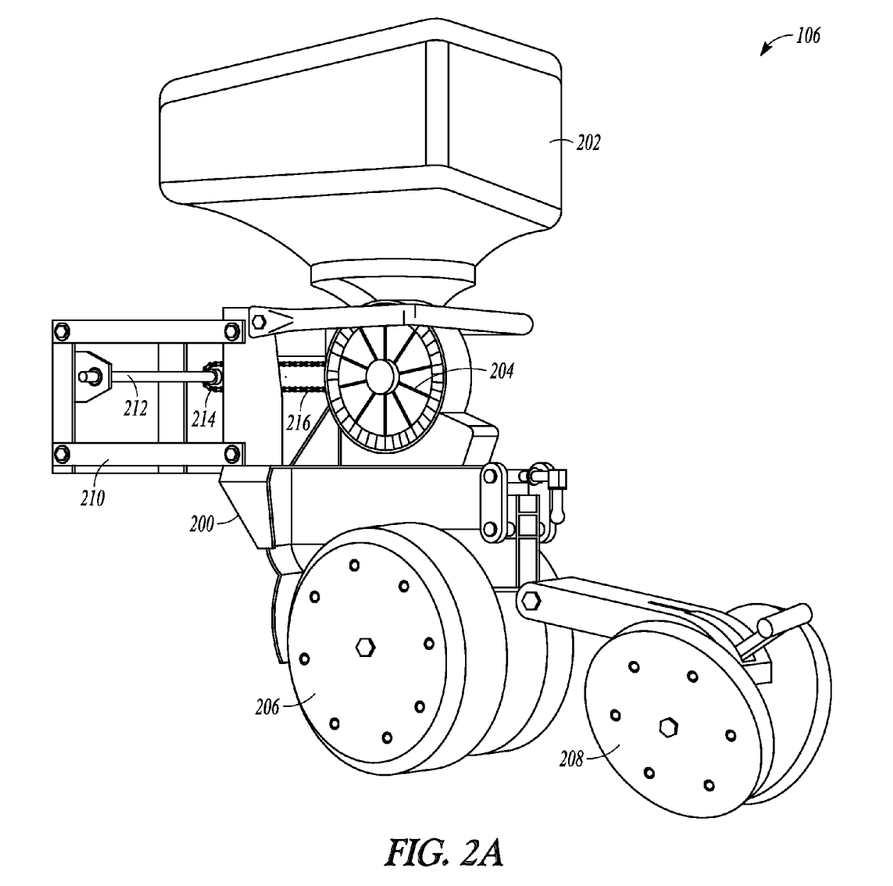
FIG. 2A is an isometric view of one example of a single planter row of an agricultural planter.

Referring now to FIG. 2A, one example of a single planter row assembly 106 is provided. The planter row assembly 106 includes a planter row body 200 and a seed hopper 202 coupled with the planter row body 200. The seed hopper 202 houses a volume of seeds therein that are eventually fed to a seed disc 204 rotatably coupled with the planter row body 200. Rotation of the seed disc 204 positions individual seeds within slots in the seed disc 204 for eventual dispensing through a seed tube configured to position the dispensed seed within a furrow, for instance in an agricultural field.

As further shown in FIG. 2A, the planter row assembly 106 includes one or more gage wheels 206 and enclosing wheels 208. In one example, the gage wheels 206 support the planter row body 200 as well as the seed hopper 202 during movement of the implement train 100 including the planter 104 through an agricultural field. The closing wheels 208 engage with the soil of the agricultural field at an angle and guide soil to fill a furrow with the planted seeds positioned therein. That is to say, the slant of the closing wheel 208 engages with the soil and biases the soil on top of the planted seeds thereby closing the furrow.

As further shown in FIG. 2A a connecting linkage 210 connects the planter row body 200 with the remainder of the planter 104. The connection linkage 210 provides an adjustable fixture that reliably couples the planter row body 200 with the remainder of the planter 104 while at the same time cooperating with a drive chain 216 coupled between a transmission shaft 212 and a plurality of sprockets that correspondingly transmit rotational movement to the seed disc 204. As shown for instance in FIG. 2A, the transmission shaft 212 extends from the left to the right relative to the planter row body 200 (e.g., into and out of the page). In one example, the transmission shaft is a hexagonal bar extending through a portion of the planter 104. A first sprocket 214 associated with the planter row assembly 106 shown in FIG. 2A receives rotational movement from the transmission shaft 212 and transmits the rotational movement through the drive chain 216 to the seed disc 204. As will be described in further detail below the first sprocket 214 is in one example a position for coupling a latching actuator assembly and a wrap spring clutch as described herein. In another example, the latching actuator assembly and the wrap spring clutch are coupled between a second sprocket adjacent to the seed disc 204. The second sprocket is sized and shaped to receive rotational movement from the drive chain 216 to accordingly rotate the seed disc 204.

Figure 2B:
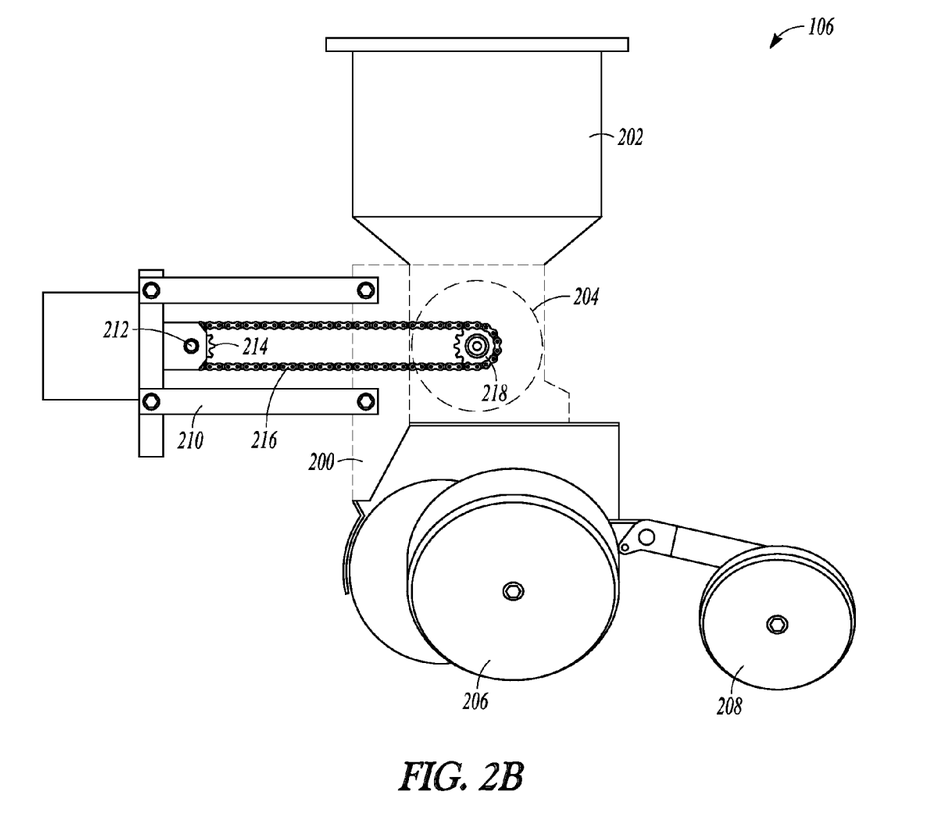
FIG. 2B is a side view of the single planter row of an agricultural planter.

FIG. 2B shows the planter row assembly 106 previously shown in FIG. 2A in a schematic view. Many of the components provided in FIG. 2A are again provided in 2B. In the example shown in FIG. 2B, the seed disc 204 and a second sprocket 218 are shown in broken lines. The second sprocket 218 is coupled with the drive chain 216. As shown, the second sprocket 218, the first sprocket 214 and the drive chain 216 provide a rotational transmission configured to rotate the seed disc 204. As previously described, rotation of the transmission shaft 212 correspondingly moves the drive chain 216 and thereby also rotates the seed disc 204.

As described above, in one example the first sprocket 214 is a location for positioning the wrap spring clutch assembly including a latching actuator assembly. In another example, a wrap spring clutch assembly including the latching actuator assembly is provided at the second sprocket 218. The latching actuator assembly cooperates with the wrap spring clutch to selectively engage and disengage the helical spring of the wrap spring clutch to thereby allow for the selective transmission of rotational power to the seed disc 204 (e.g., through locking and slipping engagement). Alternatively, where the wrap spring clutch assembly is positioned at the first sprocket 214 the selected engagement or disengagement of the latching actuator assembly with the wrap spring clutch correspondingly allows for slipping engagement and locking engagement at the wrap spring clutch to thereby provide rotational movement to the drive chain 216.

As will be described in further detail below, the provision of a wrap spring clutch assembly including the latching actuator assembly described herein allows for the selective individual powering of each of the planter row assemblies 106 shown in FIGS. 1, 2A and 2B. Additionally, the latching actuator assembly in combination with the wrap spring clutch described herein allows for retaining of the wrap spring clutch in a mechanical power transmitting or power interrupting configuration with electrical power for the latching actuator assembly provided instantaneously (e.g., momentarily such as for 100 milliseconds or less) to transition the latching actuator assembly between disengaged and engaged configurations, respectively.

Figure 3:
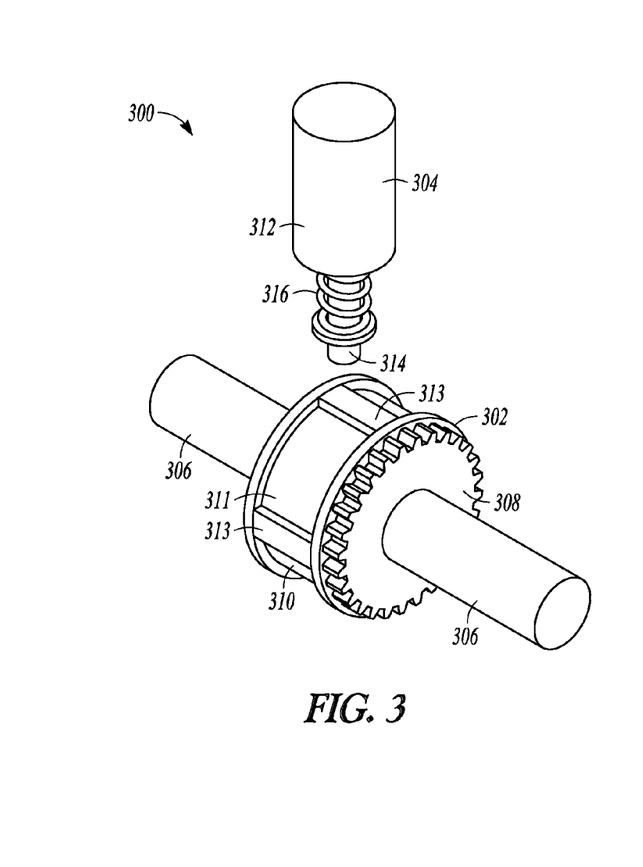
FIG. 3 is an isometric view of one example of a wrap spring clutch assembly.

FIG. 3 shows a perspective view of a wrap spring clutch assembly 300. As shown, the wrap spring clutch assembly 300 includes a wrap spring clutch 302 and a latching actuator assembly 304. In the orientation shown the latching actuator assembly 304 includes an armature plunger 314 in a retracted position relative to the wrap spring clutch 302. In the configuration shown the wrap spring clutch 302 is in locking engagement between the input 306 and the output 308 and is thereby able to transmit rotation. The input 306 includes a rotational shaft such as the transmission shaft 212 shown in FIGS. 2A and 2B. As previously described, in one example the wrap spring clutch assembly 300 is positioned at a location adjacent to the transmission shaft 212 and the first sprocket 214, shown in FIG. 2B. In this example, the output 308 includes the first sprocket 214 which is in turn coupled with the drive chain 216. In another example the wrap spring clutch assembly 300 is positioned adjacent to the planter row body 200, for instance adjacent to the second sprocket 218 shown in FIG. 2B. In this example, the input 306 includes the second sprocket 218 coupled with the drive chain 216. The output 308 corresponds to the seed disc 204 shown in phantom lines in FIG. 2B.

Referring again to FIG. 3, the wrap spring clutch 302 is coupled with the input and output 306, 308 as previously described. As further shown the wrap spring clutch 302 includes in one example a spring sleeve 310 wrapped around an exterior of the input and output features 306, 308. The spring sleeve 310 covers a wrapped helical spring positioned within the wrap spring clutch 302. The spring sleeve 310 is engaged with the helical spring as will be described herein. An actuator groove 311 in one example extends around the spring sleeve 310. One or more engagement ridges 313 extends across the actuator groove 311 to allow for selective engagement with the armature plunger 314 to interrupt rotation of the spring sleeve 310 and correspondingly decouple the input 306 from the output 308.

Referring again to FIG. 3 the latching actuator assembly 304 as shown includes an actuator housing 312 housing a plurality of components of the latching actuator assembly 304 therein. As shown in FIG. 3, the armature plunger 314 extends from the actuator housing 312 in the example. A latching spring 316 is interposed between a portion of the armature plunger 314 (e.g., a flange) and the actuator housing 312. As will be described herein the latching spring 316 biases the armature plunger 314 into an engaged position with the spring sleeve 310 to thereby facilitate a slipping engagement between the helical spring of the wrap spring clutch 302 and the input 306. In another example, the latching spring 316 biases the armature plunger out of engagement with the spring sleeve 310. Stated another way, the latching spring 316 retains the armature plunger in a disengaged position relative to the spring sleeve 310 in such an example.

Figure 4:
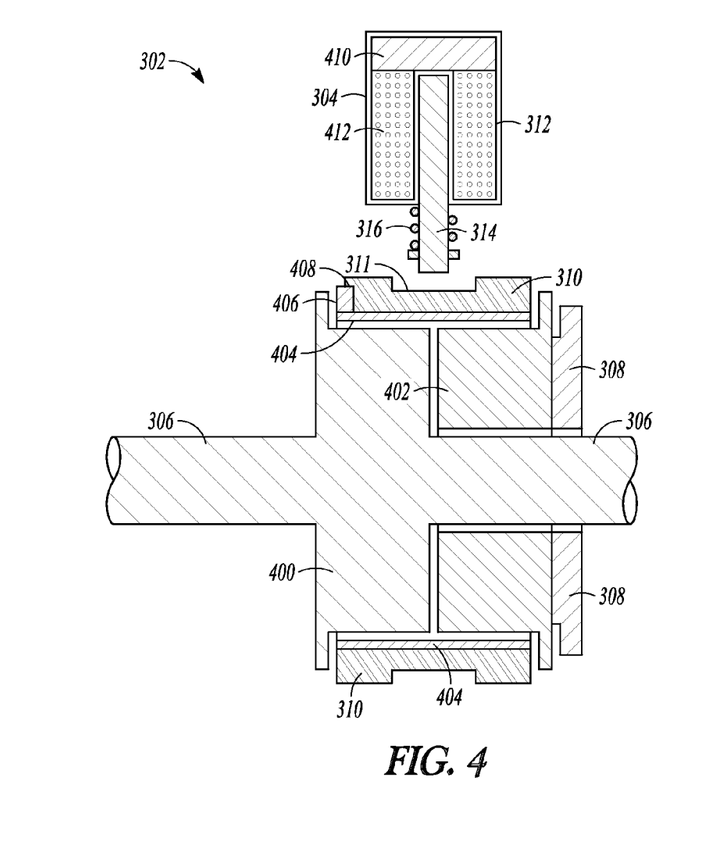
FIG. 4 is a cross sectional view of the wrap spring clutch shown in FIG. 3.

Referring now to FIG. 4, the wrap spring clutch assembly 300 previously shown in FIG. 3 is provided in cross section. Referring first to the wrap spring clutch 302, as shown the input 306 includes an input hub 400 sized and shaped to provide an exterior perimeter for selective engagement with the helical spring 404. Similarly, the output hub 402 is associated with the output 308. The output hub 402 includes a perimeter sized and shaped for engagement with the helical spring 404. In one example the helical spring 404 is coupled with the output hub 402 in a fixed manner so that rotation of the helical spring 404 is correspondingly transmitted to the output hub 402 and the output 308.

As further shown in FIG. 4, the helical spring 404 wraps around both of the input and output hubs 400, 402. The helical spring 404 is wrapped in a manner (while the latching actuator assembly 304 is disengaged from the spring sleeve 310) that rotation of the input 306 and corresponding rotation of the input hub 400 engages with the helical spring 404 and correspondingly rotates the helical spring 404. The helical spring 404 tightens into a tight locking engagement around the input hub 400. Because the helical spring 404 is fixed with the output hub 402 the output hub 402 is correspondingly rotated and thereby transmits rotation into the output 308.

As shown in FIG. 4, in one example, the spring sleeve 310 is coupled with the helical spring 404 at a portion of the helical spring including a spring projection 406. The spring sleeve 310 includes a spring recess 408 sized and shaped to receive the spring projection 406 therein. Engagement between the spring projection 406 and the spring recess 408 fixes that portion of the helical spring 404 adjacent to the projection 406 relative to the spring sleeve 310. Upon engagement of the spring sleeve 310 by the armature plunger, for instance by engaging with one of the engagement ridges 313, the spring sleeve 310 is immobilized and correspondingly immobilizes the portion of the helical spring 404 wrapped around the input hub 400 thereby breaking the rotational coupling between the input and output hubs 400, 402 and correspondingly preventing transmission of rotation from the input 306 to the output 308. In another example the spring sleeve 310 is optional. Instead, the armature plunger 314 is sized and shaped for engagement with a feature of the helical spring 404 such as the spring projection 406 shown in FIG. 4.

Referring again to FIG. 4, the latching actuator assembly 304 includes the armature plunger 314 movably positioned within the actuator housing 312. As shown, the armature plunger 314 is positioned within a solenoid coil 412. At one end of the solenoid coil 412 is a latching magnet 410. As will be described in further detail below, the latching magnet 410 and the latching spring 316 cooperate to statically position the armature plunger in one of the engaged and disengaged positions respectively. The latching magnet 410 and the latching spring 316 are able to latch the armature plunger 214 in these respective positions without requiring power input from the solenoid coil 412 (except for transitioning of the armature plunger 314 from the engaged to the disengaged position).

Figure 5A:
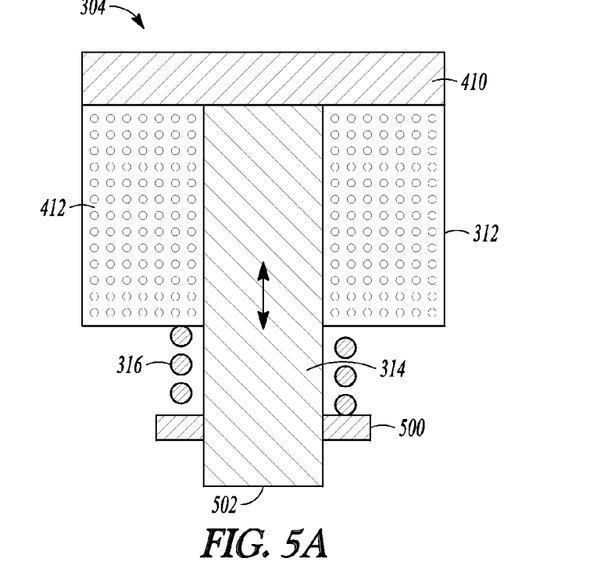
FIG. 5A is a cross sectional view of one example of a latching actuator assembly of the wrap spring clutch assembly shown in FIG. 3 in a retracted configuration.
Figure 5B:
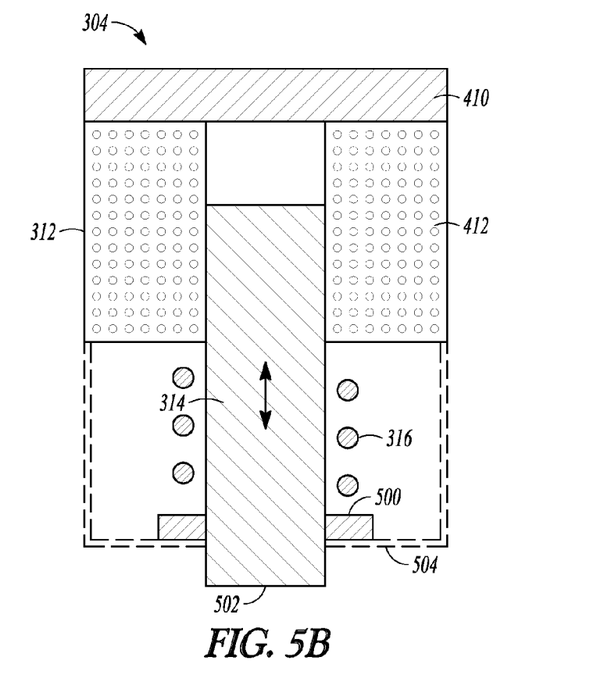
FIG. 5B is a cross sectional view of the latching actuator assembly of the wrap spring clutch assembly shown in FIG. 3 in a deployed configuration.

FIGS. 5A and 5B show schematic representations of the latching actuator assembly 304 previously shown in FIGS. 3 and 4. FIG. 5A shows the armature plunger 314 in a retracted or disengaging orientation as previously shown and described in FIGS. 3 and 4. Conversely, FIG. 5B shows the armature plunger 314 in a projecting configuration that positions the armature plunger 314 in engagement with a portion of the wrap spring clutch 302, such as the spring sleeve 310.

Referring first to FIG. 5A, the armature plunger 314 is shown withdrawn and adjacent to the latching magnet 410. The latching magnet 410 statically holds the armature plunger 314 in the withdrawn position while overcoming the bias provided by the latching spring 316 (a compression spring) that biases the armature plunger 314 in an opposed direction (i.e. the projecting direction). In this configuration the latching actuator assembly 304 is unpowered (e.g., a voltage is not applied through the solenoid coil 412). Instead, the latching magnet 410 statically holds the armature plunger 314 in position and correspondingly holds the armature plunger including a clutch actuator 502 at the end of the plunger out of engagement with the spring sleeve 310 previously shown in FIG. 3. Disengagement of the armature plunger 314 from the spring sleeve 310 allows for the transmission of rotation from the input 306 to the output 308 through operation of the wrap spring clutch 302.

When actuation of the latching actuator assembly 304 is desired a first voltage is applied to the solenoid coil 412. The voltage applied to the solenoid coil 412 needs only apply a corresponding magnetic force to the armature plunger 314 that equals or exceeds the opposed latching magnetic bias provided by the latching magnet 410. When the forces applied to the armature plunger 314 by each of the latching magnet 410 and the solenoid coil 412 match but are opposed the bias provided by the latching spring 316 will provide a sufficient force to the armature plunger (e.g., through a spring flange 500) to move the armature plunger 314 into the projecting configuration shown in FIG. 5B.

The application of voltage to the solenoid coil 412 to actuate the armature plunger 314 into the projecting configuration shown in FIG. 5B is instantaneous. That is to say, the voltage needs only be applied long enough for the latching spring 316 to operate to move the armature plunger 314 out of engagement with the latching magnet 410 (actual engagement or positioning adjacent to the latching magnet 410). Once the armature plunger 314 is positioned as shown in FIG. 5B the magnetic force applied by the latching magnet 410 is too weak to pull the latching magnet 314 back into the withdrawn position shown in FIG. 5A. Instead the latching spring 316 holds the armature plunger 314 in the position shown in FIG. 5B without any power otherwise being applied to the solenoid coil 412. In one example the instantaneous application of voltage to the solenoid coil 412 lasts for around 100 milliseconds or less. That is to say, the application of voltage to the solenoid coil 412 is momentary and thereby is not sustained during operation of the planter row assembly 106 shown in FIGS. 2A and 2B.

Referring now to FIG. 5B, the armature plunger 314 is in a projecting configuration where the armature plunger is latched by the latching spring 316 for instance against a housing periphery 504 of the actuator housing 312. As shown in FIG. 5B, the latching spring 516 has biased the armature plunger 314 away from the solenoid coil 412 and the latching magnet 410. In one example, the spring flange 500 is engaged along the housing periphery 504 to thereby reliably and accurately position (e.g., latch) the armature plunger 314 in place. For instance a clutch actuator 502 is positioned away from the position shown in FIG. 5A to allow for the engagement of the clutch actuator 502 (e.g., a projection, lug, boss and the like of the armature plunger) against the spring sleeve 311 of the wrap spring clutch 302. As shown, the latching spring 316 is released by the disengagement of the armature plunger 314 from the latching magnet 410 and thereby biases the armature plunger 314 into the position shown.

When actuation of the armature plunger 314 into the withdrawn position is desired a counter voltage is applied to the solenoid coil 412. In one example, the counter voltage applied to the solenoid coil 412 in combination with the force provided by the latching magnet 410 is greater than the bias provided by the latching spring 316. The counter voltage is applied until the armature plunger 314 slides back into the solenoid coil 412 and re-engages or is positioned adjacent to the latching magnet 410. The counter voltage applied to the solenoid coil 412 is thereafter interrupted (e.g., after being instantaneously applied) and the unpowered latching actuator assembly 304 thereafter holds the armature plunger 314 again in the configuration shown in FIG. 5A according to the bias provided by the latching magnet 410.

The latching actuator assembly 304 is thereby able to latch the armature plunger 314 in the withdrawn and projected configurations shown respectively in FIGS. 5A and 5B without otherwise requiring a consistent or ongoing application of power to the solenoid coil 412. The latching actuator assembly 304 is used in a plurality of planter row assemblies 106 to thereby individually operate each of the planter row assemblies 106. The latching actuator assemblies 304 allow for the separate operation of the planter row assemblies 106 and do so in a manner that does not require ongoing power to any of the latching actuator assemblies 304 during operation of the planter 104. That is to say, power is only applied to move the armature plunger 314 between the separate latching configurations shown in FIGS. 5A and 5B. Once the armature plunger 314 is positioned in either of the positions shown in FIG. 5A or 5B power is interrupted and the respective latching actuator assembly 304 assumes a nonpowered state. A plurality of latching actuator assemblies 304 thereby provides an efficient system and method for power consumption that accurately and responsively operates the wrap spring clutches 302 of multiple planter row assemblies 106 to consistently provide rotation or interrupt rotation of the planter row assemblies 106.

Figure 6A:
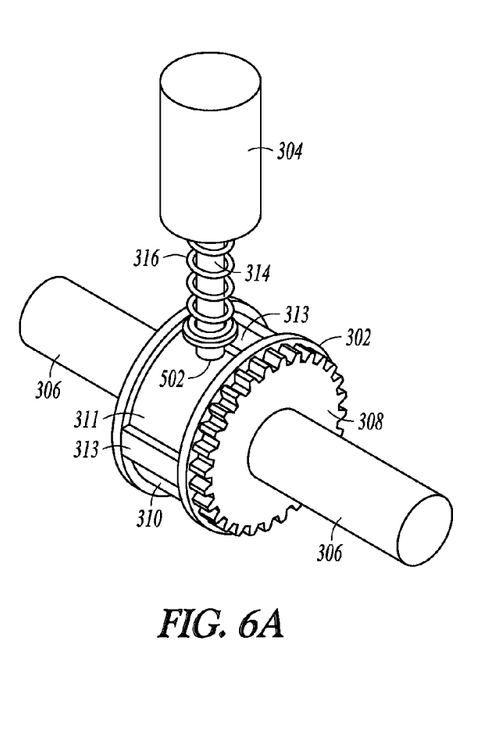
FIG. 6A is a partial cross sectional view of the wrap spring clutch assembly of FIG. 3 in a retracted configuration.
Figure 6B:
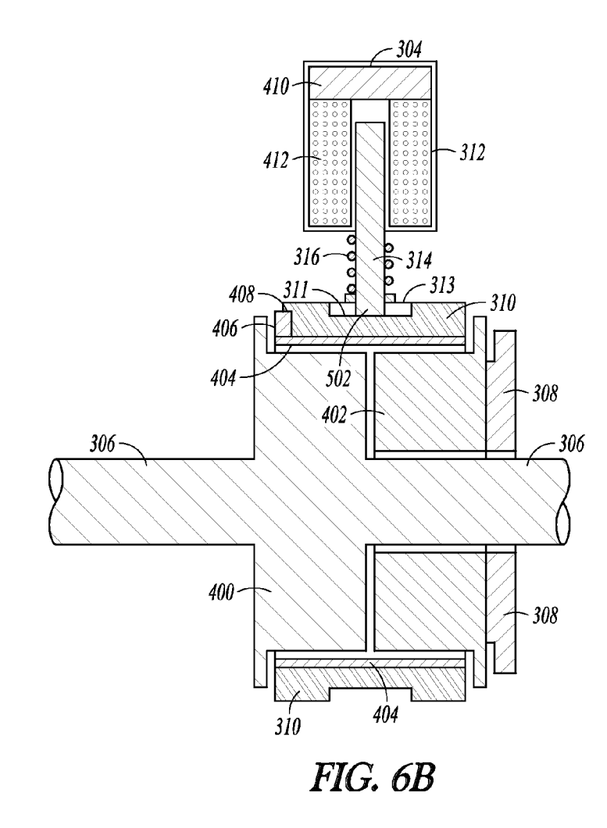
FIG. 6B is a partial cross sectional view of the wrap spring clutch assembly of FIG. 3 in a deployed configuration.

As previously described and shown in FIGS. 3 and 4, the latching actuator assembly 304 provides the armature plunger 316 in a retracted or disengaging configuration relative to the wrap spring clutch 302. For instance, as shown in FIGS. 3 and 4 the armature plunger 314 including the clutch actuator 502 (numbered in FIG. 5) is recessed away from the spring sleeve 310 (a clutch control feature including for instance the spring sleeve 310 or the spring projection 406 shown in FIG. 4). By disengaging the armature plunger 314 from the spring sleeve 310 the input 306 rotates relative to the spring sleeve 310 and the passive frictional engagement between the helical spring 404 and the input 306 (e.g., the input hub 400) tightens the spring 404 around the input hub 400 and locks the spring 404 to the input hub 400 and correspondingly transmits rotation to the output hub 402 and the output 308 shown in FIG. 4. Referring now to FIGS. 6A and 6B the converse is shown with the armature plunger 314 in an engaged position with the spring sleeve 310.

In the configuration shown in FIGS. 6A and 6B, the engagement of the clutch actuator 502 of the armature plunger 314 with one or more of the engagement ridges 313 of the spring sleeve 310 interrupts the transmission of rotational power from the input 306 to the output 308. For example referring to FIG. 6B, the engagement of the clutch actuator 502 within the actuator groove 311 of the spring sleeve 310 places the clutch actuator 502 in alignment with the engagement ridge 313 thereby preventing the continued rotation of the spring sleeve 310 relative with the input 306. Because the helical spring 404 is coupled with the spring sleeve 310 and correspondingly coupled with the output hub 402 the interruption of rotation of the helical spring 404 correspondingly prevents the transmission of rotation from the input 306 and input hub 400 through the helical spring 400 of the wrap spring clutch 302 to the output hub 402 and output 308. That is to say, with the spring sleeve 310 engaged with the armature plunger the input 306 and the input hub 400 are in slipping engagement with the helical spring 404.

As previously described, the latching of the armature plunger 314 in the position shown in FIGS. 6A and 6B (as well as the position shown in FIGS. 3 and 4) is maintained without applying power through the solenoid coil 412 of the latching actuator assembly 304. Instead, power is only applied to the solenoid coil 412 when transition of the latching actuator assembly is desired from the engaging configuration shown in FIGS. 6A and 6B to the disengaging configurations shown in FIGS. 3 and 4. Stated another way, in the latching configuration with the armature plunger 314 held in the retracted position shown in FIGS. 3 and 4 the latching magnet 410 provides the force necessary to hold the armature plunger 314 in the static orientation. Similarly, in the engaging orientation the latching spring 316 provides the force necessary to maintain the armature plunger 314 in the engaging orientation. It is only where movement between either of these orientations is required that power is actually applied to the solenoid coil 412.

For instance, as previously shown in FIGS. 5A and 5B and described herein a first voltage is applied to the solenoid coil 412 to transition the armature plunger from the disengaged orientation shown in FIG. 5A to the engaged orientation shown in FIG. 5B. For instance, the actuation voltage applied is a voltage that applies a magnetic force on the armature plunger 314 equal to or greater than the opposed force applied by the latching magnet 410. These opposed magnetic forces cancel each other out and allow the latching spring 316 to bias the armature plunger 314 into the position shown in FIG. 5B. Thereafter the latching spring 316, for instance in combination with the housing periphery 504 of the actuator housing 312, maintains the armature plunger 314 in the engaging position shown (corresponding to the position shown in FIGS. 6A and 6B) without power being applied to the solenoid coil 412. Stated another way, after the instantaneous (momentary) application of power, power flow to the solenoid coil 412 is interrupted and the latching actuator assembly 304 instead relies on the latching force provided by the latching spring 316 as opposed to any power supplied through the solenoid coil 312.

In a similar manner, where movement of the armature plunger 314 from the engaging position shown in FIGS. 6A and 6B into the disengaging orientation shown in FIGS. 3 and 4 is desired a counter voltage is applied to the solenoid coil 412. The counter voltage applied to the solenoid coil 412 correspondingly applies a reverse magnetic force on the armature plunger 314 to that applied when movement is desired from the disengaged to the engaged orientation. The magnetic force from the solenoid coil 412 (applied according to the counter voltage) when combined with the magnetic force applied to the armature plunger 314 by the latching magnet 410 exceeds the bias provided by the latching spring 316 in an opposed direction. The difference in the magnetic forces relative to the bias provided by the latching spring 316 correspondingly moves the armature plunger 314 from the position shown in FIG. 5B to that shown in FIG. 5A and the armature plunger 314 is held at an adjacent position to the latching magnet 410. After the instantaneous (100 milliseconds or less) application of power to the solenoid coil 412 the armature plunger 314 is held in the disengaged orientation shown in FIG. 5A with the armature plunger 410 latched in place by the latching magnet 410. Power is no longer applied to the latching actuator assembly 304 and the armature plunger 314 is successfully disengaged from the component of the wrap spring clutch 302, such as the spring sleeve 310 or any other clutch control feature such as a spring flange 406.

Referring again to FIG. 1, as shown the implement train 100 includes a plurality of planter row assemblies 106 on the planter 104. In one example, the planter 104 includes approximately 48 planter row assemblies 106 that are individually operated with independent wrap spring clutch assemblies 300 including wrap spring clutches 302 and latching actuator assemblies 304 as previously described herein. While pulling the planter 104 through an agricultural field the planter row assemblies 106 are individually operated to avoid over seeding and to selectively plant within nonstandard borders of the field. The provision of a latching actuator assembly 304 for each of the planter row assemblies 106 allows for the individual operation of each of the planter row assemblies 106.

Additionally, the latching actuator assemblies 304 associated with each of the planter row assemblies 106 efficiently uses power throughout the planter 104 as power is only applied to actuate the latching actuator assemblies 304 between the engaged and disengaged orientations shown in FIGS. 5A and 5B (see also FIGS. 3, 4, 6A, 6B). That is to say, latching of the armature plunger 314 to facilitate locking engagement and slipping engagement between the input and output 306, 308 is conducted without requiring a power draw from the planter 104 or the tractor 102. Instead, the latching magnet 410 and latching spring 316 passively provide the latching forces necessary to hold the armature plunger 314 in either of the engaged or disengaged positions. When it is desirable to deactivate one or more of the planter row assemblies 106 an actuation voltage is applied to the corresponding planter row assemblies 106 to move the armature plunger 314 of the disengaged orientations shown in FIGS. 3 and 4 to the engaged orientation shown in FIGS. 6A and 6B. As previously described, power is applied momentarily to move the armature plunger from the disengaged to the engaged orientation. After the armature plunger 314 is moved into the opposed position power applied to the solenoid coils 412 is interrupted. In a similar manner, where it is desired to bring one or more of the planter row assemblies 106 online and thereby operate the assemblies with the planter 104 a counter voltage is applied to the respective solenoid coils 412 to move the armature plungers 314 into the disengaged position shown in FIGS. 3 and 4. After the armature plungers 314 are moved into the disengaged orientation and latched by the latching magnets 410 the respective wrap spring clutches 302 transmit rotation from the input 306 to the output 308. Power is not otherwise supplied to the planter row assembly 106 for operation of the latching actuator assemblies 304.

Figure 7:
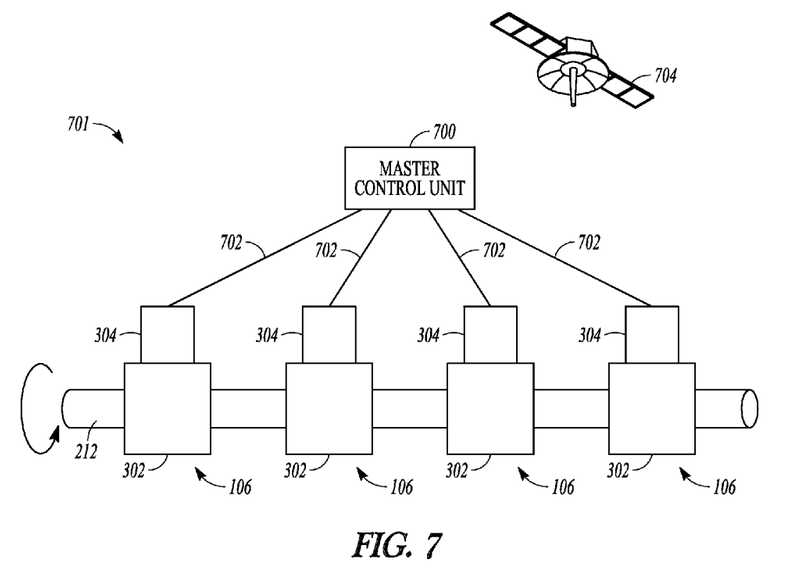
FIG. 7 is a schematic diagram of one example of a control system for one or more wrap spring clutch assemblies.

FIG. 7 shows one example of a control system 701 configured to control one or more latching actuator assemblies 304 as previously described herein. As shown, a schematic diagram is provided including a transmission shaft 212 and a plurality of wrap spring clutches 302 positioned along the transmission shaft 212. Each of the wrap spring clutches 302 includes a respective latching actuator assembly 304 coupled thereto. As further shown in FIG. 7, a control unit 700 is coupled with the latching actuator assemblies 304 by a plurality of control signal lines 702. In this example, the control unit 700 is configured to separately operate each of the latching actuator assemblies 304 through signals sent through each of the respective control signal lines 702 associated with each of the latching actuator assemblies.

In one example, where the implement train 100 is used in an agricultural field the planter 104 or tractor 102 includes a GPS system configured to work with a GPS satellite, such as the satellite 704 shown in FIG. 7. The implement train 100 is thereby able to determine its position within the agricultural field and correspondingly control one or more of the latching actuator assemblies 304 through the control unit 700. For instance, where it is desired to deactivate or activate one or more of the planter row assemblies 106 according to information obtained through the GPS signal the control unit 700 provides individual control signals to one or more corresponding latching actuator assemblies 304 shown in FIG. 7. The wrap spring clutches 302 associated with each of these designated latching actuator assemblies 304 are selectively activated or deactivated accordingly to allow for planting or interruption of planting by the associated planter row assemblies 106.

Figure 8:
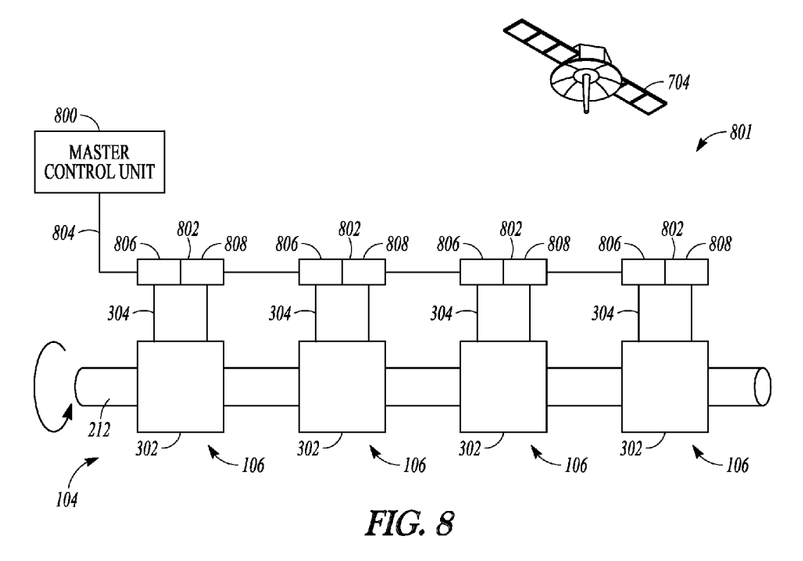
FIG. 8 is a schematic diagram of another example of a control system for one or more wrap spring clutch assemblies.

FIG. 8 shows another example of a control system 801. In this example, each of the latching actuator assemblies 304 includes a corresponding latching actuator control unit 802. The latching actuator control units 802 allow for the individual operation of each of the latching actuator control assemblies 304 and the corresponding wrap spring clutches 302 according to a single control signal provided by a control unit 800. As shown for instance in FIG. 8, the control unit 800 is coupled with each of the latching actuator assemblies 304 with a single control signal line 804 connected in series with each of the latching actuator control units 802. In other regards the planter 104 including the multiple plant row assemblies 106 is similar to the design shown in FIG. 1 and FIG. 7.

In operation, where it is desirable to activate or deactivate one or more of the plurality of planter row assemblies 106, for instance according to a GPS signal from the GPS satellite 704, the control unit 800 generates a control signal that is transmitted to each of the latching actuator control units 802. In one example, the control signal transmitted along the control signal line 804 includes unique identifiers corresponding to each of the individual latching actuator control units 802 of the planter 104. The latching actuator control units 802 include in one example signal discrimination modules 806 configured to detect the identifiers (e.g., identification markers associated with the individual latching actuator assemblies 304) within the control signal. After detecting the identifier within the control signal the control signal passes on to the control module 808 and the control module 808 is coupled in turn to the latching actuator assembly 304. The control module 808 operates the latching actuator assembly 304 according to a control signal including a component signal having the identifier detected by the discrimination module 806. For instance, the control module 808 powers the solenoid coil 412 with an actuation voltage or a counter actuation voltage to move the armature plunger 314 as previously described herein.

In another example, the control signal provided by the control unit 800 includes a plurality of control signals each having separate identifiers for each of the latching actuator control units 802. The control signal thereby includes a plurality of unique instructions for each of the latching actuator control units 802 to correspondingly toggle the latching actuator assemblies 304 for each of the planter row assemblies 106 between the activated and deactivated configurations. As previously described herein, the control signal provided by the control unit 800 ensures instantaneous or near instantaneous power is applied to the solenoid coils 412 of each of the latching actuator assemblies 304 requiring movement of an armature plunger 314 between the engaged or disengaged positions (e.g., momentary power application of 100 milliseconds or less).

In another example, the master control unit 800 produces a control signal having a variety of control signals therein each having its own frequency. The latching actuator control units 802 are configured to filter out the non-applicable signals for the other different latching actuator assemblies 304 and thereafter pass along only the filtered control signal to the control module 808 appropriate to the respective latching actuator assembly 304. The control module 808 acts upon the detected control signal and operates the latching actuator assembly 304 to individually operate each of the wrap spring clutches 302 as described herein. For instance, as shown in FIG. 8 four planter row assemblies 106 are provided for the planter 104. The control unit 800 is in one example configured to generate a control signal including component control signals each with a different frequency combined into a single composite signal. The signal discrimination modules 806 of each of the latching actuator control units 802 are configured to separately screen and pass along to the control modules 808 only the portion of the control signal having the specified frequency for one or more of the signal discrimination modules 806. In this manner the control module 808 for a particular latching actuator assembly 304 only receives the control signal associated with its specified frequency to thereby correspondingly operate the respective latching actuator assembly 304.

With each of the control systems 701, 801 described herein individual operation of each of the latching actuator assemblies 304 and the corresponding wrap spring clutches 302 is provided. An implement train 100 including the individually operated planter row assemblies 106 is thereby able to accurately and reliably operate each of the planter row assemblies 106 without requiring ongoing power application to either activate, deactivate or transition the wrap spring clutches between the slipping engagement and locking engagement configurations described herein. Instead, the latching actuator assemblies 304 latch the armature plungers 314 in the engaged and disengaged orientations without requiring power to the solenoid coils 412. Power is only required to transition the armature plungers 314 between either of the latched positions (e.g., the engaged or disengaged positions). Additionally, the power applied to the armature plungers 314 is of a momentary nature (e.g., instantaneous, 100 milliseconds or less and the like). The operation of the plurality of planter row assemblies 106 may thereby be carried out in an efficient and reliable manner without significantly drawing on power to the implement train 100 over a long period of time.

Figure 9:
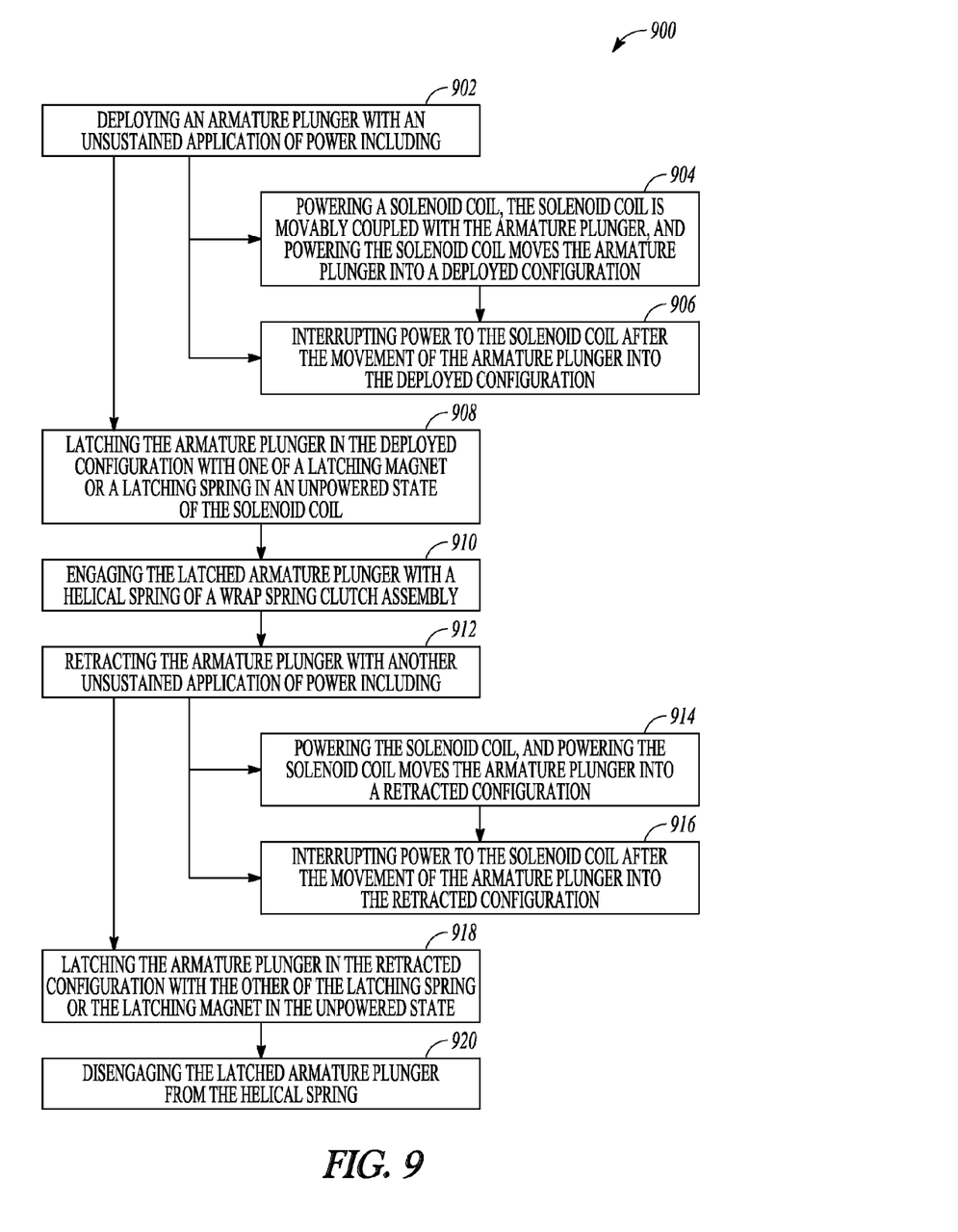
FIG. 9 is a block diagram showing one example of a method of use of a wrap spring clutch assembly.

FIG. 9 shows a block diagram illustrating one example of method 900 for using one or more latching actuator assemblies, such as the latching actuator assemblies 304 described herein with corresponding wrap spring clutches 302. In describing the method 900 reference is made to features and elements previously described herein including numbered references where convenient. Numbered elements provided within the description of the method 900 are not intended to be limiting. Instead, numbered references are provided for convenience and further include any similar features described herein as well as their equivalents. At 902, the method 900 includes deploying an armature plunger 314 with an unsustained application of power. In one example, deployment of the armature plunger 314 includes powering a solenoid coil 412. The solenoid coil 412 is moveably coupled with the armature plunger 314. Powering the solenoid coil 412 moves the armature plunger 314 into a deployed configuration, for instance from the configuration shown in FIG. 5A to the deployed configuration shown in FIG. 5B. At 906, power is interrupted to the solenoid coil 412 after the movement of the armature plunger 314 into the deployed configuration. Stated another way, power is instantaneously applied to the solenoid coil 412 to affect the transition from the retracted configuration into the deployed configuration and then ceased after the movement.

At 908, the armature plunger 314 is latched in the deployed configuration with one of a latching magnet 410 or latching spring 316 with the solenoid coil 412 in an unpowered state. At 910, the latched armature plunger 314 is engaged with a helical spring 404 of a wrap spring clutch 302. As shown for instance in FIG. 4, in one example the helical spring 404 is coupled with an intermediate spring sleeve 310 that provides the clutch control features such as the engaging ridges 313 sized and shaped for engagement with the corresponding clutch actuator 502 (see FIGS. 5A and 5B).

At 912, the method 900 includes retracting the armature plunger 314 with another unsustained application of power. As described above, an instantaneous (e.g., momentary) application of power to the solenoid coil 412 affects movement of the armature plunger 314. At 914, the solenoid coil 412 is powered with a counter voltage relative to the voltage applied in 904. Powering the solenoid coil 412 moves the armature plunger 314 into a retracted configuration such as the configuration shown in FIG. 5A. At 916, power to the solenoid coil 412 is interrupted after movement of the armature plunger 314 into the retracted configuration. At 918, the armature plunger 314 is thereafter latched in the retracted configuration with one of the latching spring 316 or the latching magnet 410 while the solenoid coil is in the unpowered state. As previously described herein, in one example the latching magnet 410 provides the latching force to the armature plunger 314 in the retracted configuration and the latching spring 316 provides latching force (e.g., spring bias) on the armature plunger 314 in the deployed configuration.

In yet another example, the latching magnet 410 and the latching spring 316 are exchanged and the latching magnet 410 correspondingly provides the latching of the armature plunger 314 in the deployed configuration and the latching spring 316 provides the latching force in the retracted configuration. In still another example, the latching actuator assembly 304 includes opposed latching magnets 410 or latching springs 316 that correspondingly latch the plunger 314 in both of the deployed and retracted configurations.

At 920, the method 900 further includes disengaging the latched armature plunger 314 from the helical spring 404. For instance, in the retracted configuration shown in FIG. 4 and FIG. 5B the armature plunger 314 is withdrawn from the spring sleeve 310 thereby disengaging the clutch actuator 502 of the armature plunger 314 from the clutch control feature 313 (see FIGS. 5A, 5B).

Several options for the method follow. In one example, powering the solenoid coil 412 is substantially instantaneous as described herein. Conversely, latching the armature plunger 314 in either the retracted or deployed configurations requires no application of power to the solenoid coil 412. In another example, powering the solenoid coil 412 is only conducted when changing between the deployed and retracted configurations. Stated another way, a voltage or counter voltage is applied to the solenoid coil 412 only when transitioning the armature plunger 314 between one of the deployed and retracted configuration.

In another example, powering the solenoid coil 412 includes applying a counter coil bias (e.g., a counter voltage) greater than a magnetic bias applied by the latching magnet 410 to latch the armature plunger 314 in one of the retracted or deployed configuration. For instance, the counter coil bias is applied to offset the bias supplied by the latching magnet 410 and thereby allow the latching spring 316 to bias the armature plunger 314 into the deployed configuration shown in FIG. 5B. In yet another example, powering the solenoid coil 412 includes applying a coil bias (e.g., a voltage) to the solenoid coil that in combination with the magnet bias of the latching magnet 410 is greater than a bias otherwise provided by the latching spring 316. The application of the coil bias in combination with the magnet bias of the latching magnet 410 moves the armature plunger 314 into the retracted configuration shown in FIG. 5A thereby overcoming the spring bias of the latching spring 316 and allowing the latching magnet 410 to latch the armature plunger 314 into the retracted position.

In still another example, the method 900 further includes controlling two or more armature plungers 314 of two or more corresponding latching actuator assemblies 304 separately coupled with a control unit such as the control unit 700 and 800 shown in FIGS. 7 and 8. Optionally, one or more of deploying and retracting the armature plunger 314 includes controlling two or more armature plungers 314 of two or more corresponding latching actuator assemblies 304 with a multicomponent control signal such as the control signal 804 used in the control system 801 shown in FIG. 8. In the example with the multicomponent control signal 804, controlling the two or more armature plungers 314 includes discriminating a component control signal from the multicomponent control signal for a first latching actuator assembly 304 of the two or more actuators assemblies 304 and then using the component control signal to deploy or retract the armature plunger 314 of the first latching actuator assembly of the two or more latching actuator assemblies.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A wrap spring clutch system including one or more wrap spring clutch assemblies, the one or more wrap spring clutch assemblies comprising:
   a latching actuator assembly including:
      an armature plunger having a clutch actuator at one end of the armature plunger,
      a solenoid coil movably coupled with the armature plunger, and in a powered solenoid coil state the solenoid coil moves the armature plunger between deployed and retracted configurations,
      a latching magnet configured to latch the armature plunger in one of the deployed or retracted configuration in an unpowered solenoid coil state with the armature plunger near the latching magnet, and
      a latching spring configured to latch the armature plunger in the other of the deployed or retracted configuration in an unpowered solenoid coil state with the armature plunger remote from the latching magnet;
   a rotatable input hub;
   a rotatable output hub configured for rotation by the input hub; and
   a helical spring engaged with the output hub and selectively engaged with the input hub in slipping engagement and locking engagement according to the deployed or retracted configuration of the armature plunger,
      in the deployed configuration the clutch actuator is engaged with the helical spring, the solenoid coil is in an unpowered state, and the helical spring is in slipping engagement with the input hub, and
      in the retracted configuration the clutch actuator is disengaged with with the helical spring, the solenoid coil is in the unpowered state, and the helical spring is in locking engagement with the input hub.

2. The wrap spring clutch assembly of claim 1, where the latching magnet latches the armature plunger through a magnetic bias of the latching magnet applied to the armature plunger.

3. The wrap spring clutch assembly of claim 2, wherein the solenoid coil in the powered solenoid coil state applies a counter bias greater than the magnetic bias of the latching magnet.

4. The wrap spring clutch assembly of claim 1 comprising an actuator housing, and the housing is coupled with one or more of the armature plunger, the solenoid coil, the latching magnet and the latching spring.

5. The wrap spring clutch assembly of claim 1 comprising at least two armature plunger stops, the armature plunger is configured to engage with one of the armature plunger stops when latched by the latching magnet, the armature plunger is configured to engage with the other of the armature plunger stops when latched by the latching spring.

6. The wrap spring clutch assembly of claim 5, wherein one of the plunger stops includes a surface of the latching magnet, and the other of the plunger stops includes a portion of an actuator housing.

7. The wrap spring clutch assembly of claim 1, wherein the powered solenoid coil state is an instantaneous state that moves the armature plunger between the deployed and retracted configurations.

8. The wrap spring clutch assembly of claim 7, wherein the instantaneous state is about 100 milliseconds or less.

9. A wrap spring clutch system including one or more wrap spring clutch assemblies, the one or more wrap spring clutch assemblies comprising:
  a rotatable input hub;
  a rotatable output hub;
  a helical spring engaged with the output hub and selectively engaged with the input hub in slipping engagement and locking engagement, the helical spring includes a clutch control feature; and
  a latching actuator assembly configured to engage and disengage the clutch control feature, the latching actuator assembly includes:
    an armature plunger, one end of the armature plunger includes a clutch actuator configured for engagement with the clutch control feature,
    a solenoid coil, the armature plunger is movably coupled within the solenoid coil, and the solenoid coil moves the clutch actuator toward engagement or disengagement with the clutch control feature in a powered state,
    a latching magnet coupled with the solenoid coil, and the latching magnet latches the clutch actuator into one of disengagement or engagement with the clutch control feature with the solenoid coil in an unpowered state, and
    a latching spring coupled with the armature plunger, and the latching spring latches the clutch actuator into the other of engagement or disengagement with the clutch control features with the solenoid coil in the unpowered state.

10. The wrap spring clutch assembly of claim 9, wherein the powered state of the solenoid coil includes a positive powered state and a negative powered state, and
  in the positive powered state the solenoid coil moves the clutch actuator into engagement or disengagement with the clutch control feature, and
  in the negative powered state the solenoid coil moves the clutch actuator into the other of disengagement or engagement with the clutch control feature.

11. The wrap spring clutch assembly of claim 10, wherein the positive powered state includes a positive voltage applied to the solenoid coil, and the negative powered state includes a negative voltage applied to the solenoid coil.

12. The wrap spring clutch assembly of claim 11, wherein the solenoid coil in the powered state applies a coil bias to the armature plunger that in combination with a magnet bias of the latching magnet is greater than a spring bias of the latching spring to move the clutch actuator toward the latching magnet.

13. The wrap spring clutch assembly of claim 9, wherein the solenoid coil in the powered state applies a counter coil bias to the armature plunger that is greater than a magnet bias of the latching magnet to move the clutch actuator toward the latching spring.

14. The wrap spring clutch assembly of claim 9, wherein the powered state is an instantaneous powered state.

15. The wrap spring clutch assembly of claim 9, wherein the helical spring is in slipping engagement with the input hub when the clutch actuator is engaged with the clutch control feature, and the helical spring is in locking engagement with the input hub when the clutch actuator is disengaged with the clutch control feature.

16. The wrap spring clutch assembly of claim 9, wherein the clutch control feature includes a flange extending from the helical spring.

17. The wrap spring clutch assembly of claim 9, wherein the clutch control feature includes a spring sleeve statically coupled around the helical spring, and the spring sleeve includes one or more ridges configured for engagement with the clutch actuator.

18. The wrap spring clutch assembly of claim 9 comprising a control unit separately coupled with two or more of the wrap spring clutch assemblies.

19. The wrap spring clutch assembly of claim 9 comprising:
  a control unit coupled with two or more of the wrap spring clutch assemblies, the control unit is configured to deliver a multi-component control signal to the two or more wrap spring clutch assemblies;
  a latching actuator control unit for each of the two or more wrap spring clutch assemblies, the latching actuator control unit includes:
    a signal discrimination module configured to discriminate for a component control signal within the multi-component control signal, and
    a control module configured to selectively power the solenoid coil according to the component control signal.

20. A method for using one or more latching actuator assemblies in a wrap spring clutch system comprising:
  deploying an armature plunger with an unsustained application of power including:
    powering a solenoid coil, the solenoid coil is movably coupled with the armature plunger, and powering the solenoid coil moves the armature plunger into a deployed configuration, and
    interrupting power to the solenoid coil after the movement of the armature plunger into the deployed configuration;
  latching the armature plunger in the deployed configuration with one of a latching magnet or a latching spring in an unpowered state of the solenoid coil;

engaging the latched armature plunger with a helical spring of a wrap spring clutch assembly;

retracting the armature plunger with another unsustained application of power including:

powering the solenoid coil, and powering the solenoid coil moves the armature plunger into a retracted configuration, and interrupting power to the solenoid coil after the movement of the armature plunger into the retracted configuration;

latching the armature plunger in the retracted configuration with the other of the latching spring or the latching magnet in the unpowered state; and disengaging the latched armature plunger from the helical spring.

21. The method of claim 20, wherein powering the solenoid coil is substantially instantaneous, and latching the armature plunger requires no application of power to the solenoid coil.

22. The method of claim 20, wherein powering the solenoid coil is only conducted when changing between the deployed and retracted configurations.

23. The method of claim 20, wherein powering the solenoid coil includes applying a counter coil bias greater than a magnet bias applied by the latching magnet to latch the armature plunger in one of the retracted or deployed configuration.

24. The method of claim 20, wherein powering the solenoid coil includes applying a coil bias that in combination with a magnet bias of the latching magnet is greater than a spring bias of the latching spring.

25. The method of claim 20, wherein latching the armature plunger in the deployed configuration includes latching the armature plunger in the deployed configuration with a spring bias of the latching spring.

26. The method of claim 20, wherein latching the armature plunger in the retracted configuration includes latching the armature plunger in the retracted configuration with a magnetic bias of the latching magnet.

27. The method of claim 20, wherein deploying the armature plunger includes positioning a clutch actuator of the armature plunger in engagement with a clutch control feature of a helical spring of a wrap spring clutch, and retracting the armature plunger includes disengaging the clutch actuator from engagement with the clutch control feature.

28. The method of claim 20, wherein one or more of deploying and retracting the armature plunger includes controlling two or more armature plungers of two or more corresponding latching actuator assemblies separately coupled with a control unit.

29. The method of claim 20, wherein one or more of deploying and retracting the armature plunger includes controlling two or more armature plungers of two or more corresponding latching actuator assemblies with a multi-component control signal.

30. The method of claim 29, wherein controlling two or more armature plungers includes:

discriminating a component control signal from the multi-component control signal for a first latching actuator assembly of the two or more actuator assemblies, and using the component control signal to deploy and retract the armature plunger of the first latching actuator assembly.

* * * * *

UNITED STATES PATENT AND TRADEMARK OFFICE
CERTIFICATE OF CORRECTION

PATENT NO.        : 8,936,143 B2
APPLICATION NO.   : 13/491406
DATED             : January 20, 2015
INVENTOR(S)       : Jesse Wagers Page 1 of 1

It is certified that error appears in the above-identified patent and that said Letters Patent is hereby corrected as shown below:

Title page

Item (56), under "Foreign Patent Documents", line 2, after "9/2003", insert
--¶WO WO-2003077407 A2 9/2003--, therefor In the claims In column 14, line 67, in Claim 1, after "with", delete "with", therefor Signed and Sealed this
Third Day of November, 2015

Michelle K. Lee
*Director of the United States Patent and Trademark Office*